United States Patent
Olsson et al.

(10) Patent No.: US 6,994,898 B2
(45) Date of Patent: Feb. 7, 2006

(54) PACKAGING CONTAINER PACKAGING LAMINATE AND A METHOD OF PRODUCING A PACKAGING CONTAINER

(75) Inventors: Håkan Olsson, Lund (SE); Jonny Olander, Trelleborg (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 78 days.

(21) Appl. No.: 10/471,240

(22) PCT Filed: Mar. 11, 2002

(86) PCT No.: PCT/SE02/00437

§ 371 (c)(1),
(2), (4) Date: Sep. 9, 2003

(87) PCT Pub. No.: WO02/072435

PCT Pub. Date: Sep. 19, 2002

(65) Prior Publication Data

US 2004/0096605 A1 May 20, 2004

(30) Foreign Application Priority Data

Mar. 13, 2001 (SE) .................................. 0100859

(51) Int. Cl.
*B32B 1/08* (2006.01)
*B65D 3/28* (2006.01)
*D21J 1/00* (2006.01)

(52) U.S. Cl. .................... 428/34.2; 428/34.3; 162/197; 493/293; 220/62.19; 220/62.2

(58) Field of Classification Search ............... 428/34.2, 428/34.3; 162/197; 493/293; 220/62.19, 220/62.2
See application file for complete search history.

(56) References Cited

U.S. PATENT DOCUMENTS

| | | | |
|---|---|---|---|
| 4,525,396 A | * | 6/1985 | Takasa et al. ............... 428/34.2 |
| 4,642,252 A | | 2/1987 | Sasaki et al. |
| 4,760,949 A | | 8/1988 | Elias |
| 4,766,019 A | | 8/1988 | Michaels et al. |
| 6,488,810 B1 | * | 12/2002 | Halmschlager ............. 162/109 |

FOREIGN PATENT DOCUMENTS

| | | |
|---|---|---|
| DE | 2750740 | 5/1978 |
| EP | 0166667 | 1/1986 |
| SE | 451323 | 9/1987 |
| WO | 9959882 | 11/1999 |

* cited by examiner

*Primary Examiner*—William P. Watkins, III
(74) *Attorney, Agent, or Firm*—Buchanan Ingersoll

(57) ABSTRACT

A packaging container for a pressurized, liquid food, the packaging container being formed from a packaging laminate which includes at least one core layer of paper or paperboard displaying one major fibre orientation in a first direction thereof. According to the invention, said core layer is pre-strained in a second direction which is substantially at right angles to said first direction, with a view to reducing or eliminating expansion in the finished, filled packaging container during storage thereof. The present invention also encompasses a packaging laminate for the packaging container, as well as a method of producing the packaging container.

16 Claims, 5 Drawing Sheets

PACKAGING CONTAINER PACKAGING LAMINATE AND A METHOD OF PRODUCING A PACKAGING CONTAINER

TECHNICAL FIELD

The present invention relates to a packaging container for a pressurised, liquid food, e.g. beer, carbonated soft drinks, carbonated water or sparkling wine, the packaging container being formed from a packaging laminate which includes at least one core layer of paper or paperboard displaying one major fibre orientation in a first direction thereof. The present invention also relates to the packaging laminate for the packaging container, as well as a method of producing the packaging container.

BACKGROUND ART AND PROBLEMS

Packaging containers commercially available on the market which are under continuous inner excess pressure because they are filled with a pressurised liquid food such as beer, carbonated soft drinks, carbonated water or sparkling wine today consist of containers produced from glass, plastic or metal.

Attempts have been made to manufacture such containers from a packaging laminate comprising core layers of paper and paperboard, as well as gas barrier layers and liquid barrier layers. However, in such contexts one problem occurs which may be traced to the stretching or straining of the fibres in the paper or paperboard layer (the core layer). The reason for this is that, on the production of the paper or paperboard layer in a paper or paperboard machine, the fibre network is stretched in the machine direction of the paper or paperboard machine, while a corresponding stretching in the transverse direction does not take place. Further, the fibres are substantially oriented in the machine direction of the paper or paperboard web as a result of the forming of the web when a stock jet of a cellulose stock is directed at the wire which runs in the machine direction.

When a tubular packaging container for a pressurised, liquid food is to be produced from a packaging laminate which includes a core layer of such paper or paperboard, the paper or paperboard is suitably utilised such that the machine direction of the paper or paperboard coincides with a tangent to the circumference of the packaging container, i.e. the paper or paperboard is disposed such that the fibres are principally oriented in a direction around the circular circumference of the container. The reason for this is that the paper or paperboard displays the greatest strength in this direction, because of the fibre orientation, at the same time as the greatest strains in the material, because of the inner excess pressure, occur in this direction. However, strains will naturally also occur as a result of the inner excess pressure in the axial direction of the container, which implies that the paper or paperboard material will expand ("creep") in the axial direction of the container so that the container increases in length after having stood for some time on the shelf. This is particularly because the fibres initially, as per the above, do not display an appreciable stretching in the transverse direction of the paper or paperboard, i.e. in the axial direction of the container. If, instead, the packaging laminate were to be turned through 90°, this problem would naturally instead occur in the tangential direction of the container, in which event the container would swell and there would at the same time be a risk of failure.

WO 99/59882 discloses a packaging laminate which is formed with several, e.g. four, layers of paper or paperboard. Moreover, the risk of failure has been reduced in that the longitudinal joints for these different layers have been disposed in different positions around the circumference of the container. This formation of the packaging laminate and container is not, however, commercially viable because of the extreme costs which are incurred because of the large thickness—or in other words the large quantity—of paperboard which is consumed and because of the complex process for realising longitudinal joints in different positions around the circumference of the container.

OUTLINE OF THE INVENTION

The present invention has for its object to obviate the above-outlined problem structure and, more specifically, to propose a packaging container for a pressurised, liquid food, the packaging container being simple—and thereby economical—to manufacture, which does not require large quantities of paper or paperboard and which nevertheless is configurationally stable on storage thereof with contents of a pressurised, liquid food. The present invention further has for its object to propose a packaging laminate for a packaging container according to the present invention, as well as to propose a method of producing a packaging container according to the present invention.

These and other objects are attained by means of the packaging container, the packaging laminate, as well as the method of producing the packaging container as these are defined in the appended claims.

The inventive concept is to take out in advance the major proportion of the expansion or creep of the packaging laminate, more specifically its core layer of paper or paperboard, which occurs when this is subjected to a continuous excess pressure. Hereby, the packaging laminate can, in the finished packaging container, be exposed to a relatively large continuous loading despite a relatively slight material quantity in the core layer, because a displacement of the creep curve of the core layer takes place. In particular, it is intended to carry out a pre-expansion or pre-straining in the transverse direction of the paper or paperboard, i.e. a direction which is substantially at right angles to the major fibre orientation of the paper or the paperboard, normally a direction which is at right angles to the machine direction. This is realised in that at least the core layer of the packaging laminate for the packaging container is pre-strained in a direction (hereafter referred to as the second direction) which is at right angles to the direction of the major fibre orientation (hereafter referred to as the first direction), at a point in time prior to the closure of the packaging container.

The pre-straining according to the present invention may be carried out on the core layer already before this is laminated together with other layers in the packaging laminate. Alternatively, the pre-straining may be carried out on the packaging laminate before this is reformed into a container body, or the pre-straining may also be carried out on the packaging container in connection with this being filled with the pressurised, liquid food.

The core layer displays, after the pre-straining, a longitudinal dimension ($L_{exp}$) in the second direction, this longitudinal direction ($L_{exp}$) being about 1–6%, preferably 1–5% greater than the corresponding longitudinal direction ($L_0$) in the core layer in the non expanded or strained state. This implies in other words that a dimension between two points in the core layer, these two points being oriented in the second direction in relation to one another, increases by 1–6%, preferably 1–5% when the pre-straining is carried out.

An absolute upper limit for the pre-straining naturally consists of the strain at failure limit of the core layer or the packaging laminate, in its second direction. Another method of expressing the preferred level of pre-straining is, therefore, to relate to the failure limit of the core layer or the laminate, e.g. that the pre-straining is carried out with at least 20% of the strain to failure limit, but at most 95%, preferably at most 90% and even more preferably at most 85% of the strain to failure limit. For a paper or paperboard layer of the type utilised here, the strain to failure limit is 1.5–2.5% in the machine direction and 5–6% in the transverse direction.

BRIEF DESCRIPTION OF THE ACCOMPANYING DRAWINGS AND DETAILED DESCRIPTION OF THE INVENTION

The present invention will now be described in greater detail hereinbelow, with reference to the accompanying Drawings, in which.

Figure 1:
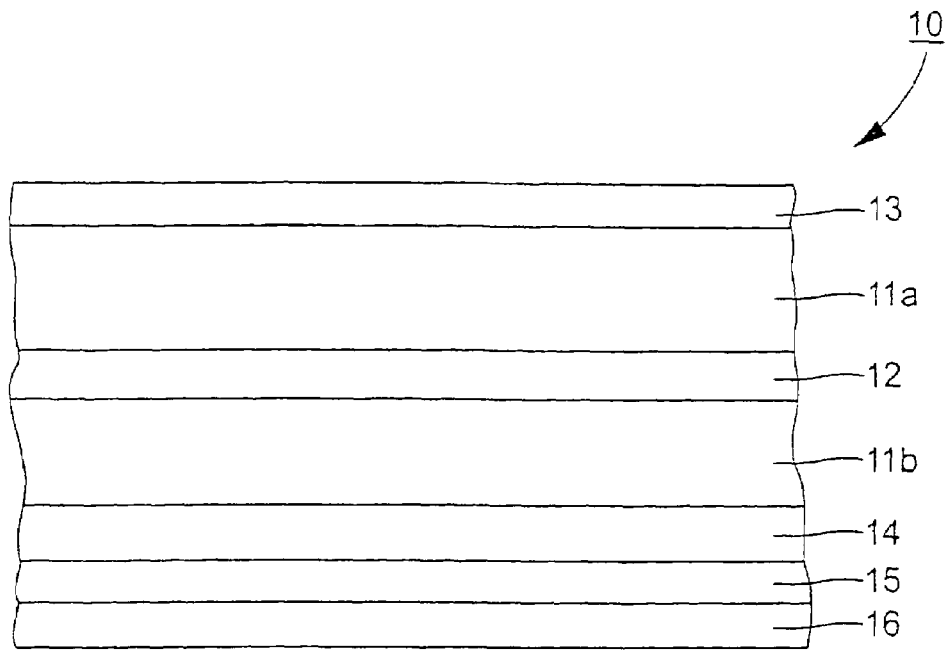
FIG. 1 shows a cross section through a first embodiment of a packaging laminate according to the present invention.

FIG. 1 shows a first embodiment of a packaging laminate 10 according to the present invention. This displays two core layers 11*a* and 11*b* of paper or paperboard. A total grammage of the paper layer in the laminate is normally 200–400 g/m², preferably 200–350 g/m² and even more preferably 200–300 g/m², suitably distributed approximately equally on the two core layers 11*a* and 11*b*. The core layers 11*a* and 11*b* are further suitably continuously joined together throughout substantially all of there mutually facing surfaces, by means of a layer of layer of adhesive 12 which, for example, may consist of starch or polyethylene. On the one side of the laminate which is intended to constitute the outside of the packaging container which is produced from the laminate, there is disposed a thin layer 13 of a thermoplastic material, preferably polypropylene. On the opposing side of the core layers 11*a*, 11*b*, there are provided layers comprising, on the one hand, an adhesive layer 14 of for example, adhesive thermoplastic, preferably polyethylene or polypropylene, and, on the other hand, a barrier layer 15 as well as a thermoplastic coating 16 which is disposed outside the barrier layer and preferably consists of polypropylene, the core layer being continuously covered by said layers throughout all of its surface. The term barrier layer 15 is here taken to signify a layer which principally constitutes a barrier against oxygen gas. One preferred barrier layer consists of a metal foil layer, preferably an aluminium foil layer.

Figure 2:
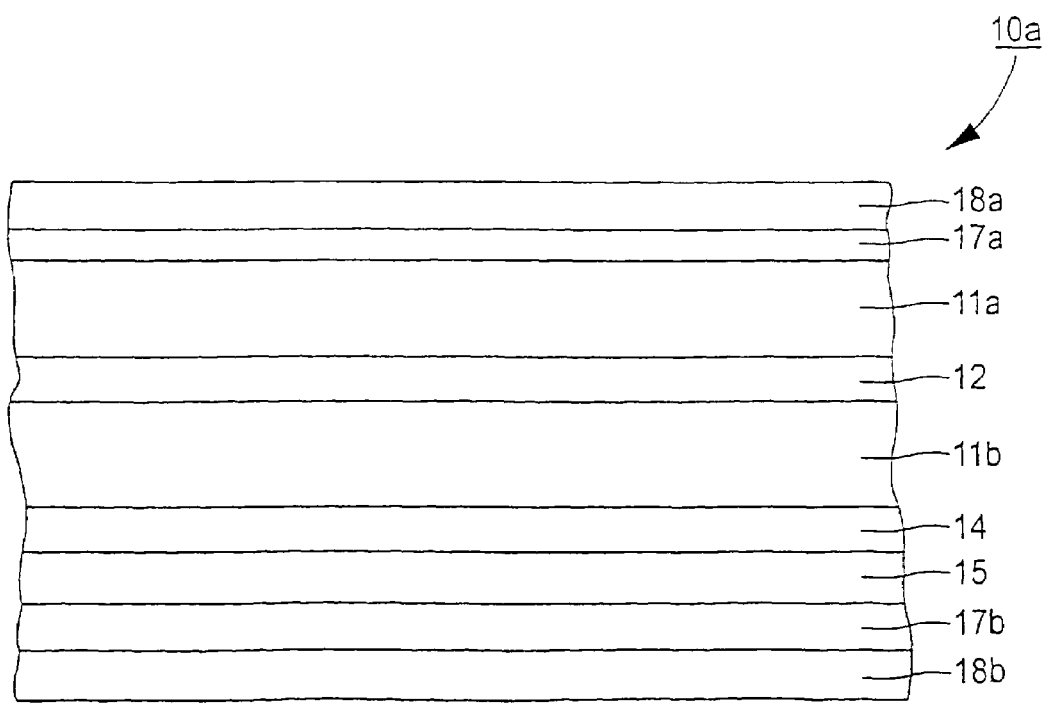
FIG. 2 shows a cross section through a second embodiment of a packaging laminate according to the present invention.

FIG. 2 shows a second embodiment of a packaging laminate 10*a* according to the present invention which in all respects corresponds to that illustrated in FIG. 1, but which, instead of outermost layers of polypropylene, displays double outer layers 17, 18*a*, and 17*b*, 18*b*, respectively, of polyethylene and polyethylene terephthalate, respectively, the polyethylene terephthalate layer 18*a, b*, constituting the two outermost layers in the packaging laminate. On the inside of the laminate, the polyethylene layer 17*b* suitably consist of low density polyethylene (LDPE).

In addition to the embodiments illustrated in FIG. 1 and FIG. 2, the packaging laminate may naturally be built up in a large number of other ways, e.g. with other types of gas barrier layers and liquid barrier layers. The laminate may also be formed such that it only displays one core layer of paper or paperboard, or possibly three or more layers, this latter being, however, less preferred from the economic view point. When more than one core layer exists, at least two of these, and even more preferably all of these core layers of paper or paperboard are suitably pre-strained according to the present invention.

Figure 3:
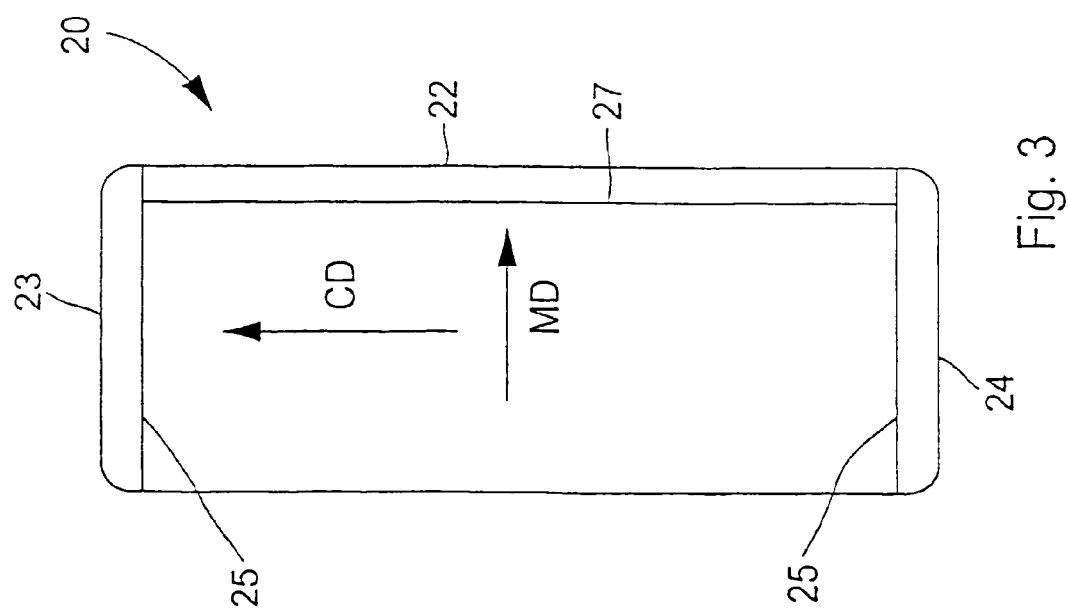
FIG. 3 shows a first embodiment of a packaging container according to the present invention, seen from the side.

FIG. 3 shows a first embodiment of a packaging container 20 according to the present invention. This displays a container body 22 which consists of a circular-cylindrical tubular body of circular cross section and provided with a durable longitudinal joint 27, preferably made by thermosealing of the thermoplastic layers in the laminate. A lid 23 and a bottom 24 are joined together with the container body 22 by durable joints 25, preferably made by thermosealing. The lid and bottom shown in the Figure should only be viewed as illustrations in principle, and the actual formation and design of the lid and/or bottom may be put into effect in a number of different ways, including numerous variations of opening arrangements. Further, the machine direction MD for the core layer in the packaging container/packaging laminate has been indicated by an arrow in the Figure. This machine direction corresponds to the major fibre orientation and, in this context, is also designated the first direction. Correspondingly, the transverse direction CD of the core layer has been marked by an arrow, and this transverse direction substantially coincides with a generatrix of the container body and, in this context, is designated the second direction. The outer dimensions of the packaging container 20 correspond typically to, for example, a container for beer, conventional dimensions of a beer can of metal which typically accommodates 33 and 50 cl.

Figure 4:
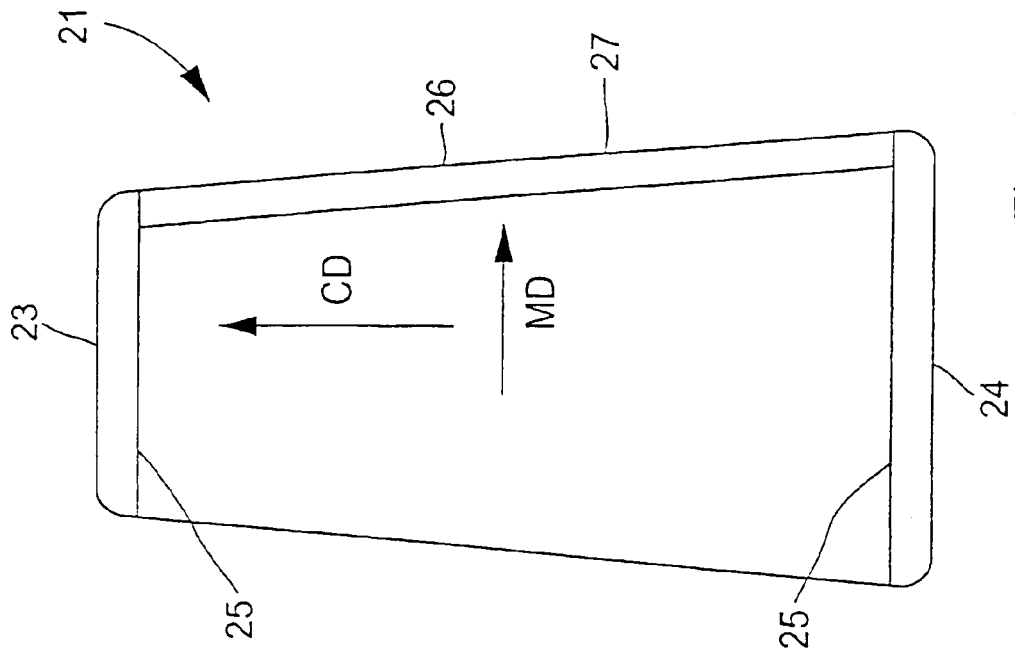
FIG. 4 shows a second embodiment of a packaging container according to the present invention, seen from the side.

FIG. 4 shows a second embodiment of the packaging container 21 according to the invention, which in all respects corresponds to the packaging container 20 apart from the fact that the container body 26 displays a conically tapering configuration with circular cross section.

In the production of the packaging container or packaging laminate according to the present invention, the pre-straining of the core layer/core layers is put into effect according to a first embodiment in that a movable web of said core layer (paper or paperboard layer), this web displaying one major fibre orientation in its direction of movement or machine direction, is pre-strained in the second direction which constitutes the transverse direction of the web. More specifically, this may, for instance, be realised in that both longitudinal edges of the web are fixedly held by gripping members, a tensile loading being applied on the web in its transverse direction with the aid of a drawing device connected to the gripping members. Possibly, a minor pre-straining may also be put into effect in the machine direction. It is also conceivable, instead of or in combination with a tensile loading, to execute a compressive loading on the one side of the web, at the same time as both longitudinal edges of the web are fixedly held by the gripping members. Such a compressive loading could be put into effect by means of a gas pressure which is applied on the one side of the web.

According to a second embodiment of the present invention, the pre-straining takes place by loading of the finished packaging laminate or on two or more layers thereof which included at least one core layer of the packaging laminate. This may be put into effect on a movable web of laminate in a manner that is fully analogous with that described in the foregoing, or batchwise on one larger or smaller piece of packaging laminate at a time.

According to a third embodiment of the present invention, the pre-straining is carried into effect in that the reformed container body is pressure-loaded interiorly with a pressurising medium before or while the container body is filled with the food. In such instance, it is preferred, but not necessary, that said pressurising medium consist of the pressurised, liquid food proper. Alternatively, the pressurising medium may consist of another liquid or of a gas, e.g. air. The pressurisation is preferably carried into effect at a pressure of 1–12 bar and even more preferably 3–8 bar during a requisite period of time for the pre-straining to take place. When the pressurising agent consists of the liquid food, the pressure in the container body is thereafter reduced before the container body is closed. In another case, the pressure is released wholly, whereafter the container is filled with the liquid food and closed.

According to one variation of the present invention, the loading, regardless of embodiment, may be put into effect at elevated temperature, above room temperature, and/or at elevated moisture content in the paper or the paperboard, with a view to increasing the effect of the loading.

EXAMPLES

Figure 5:
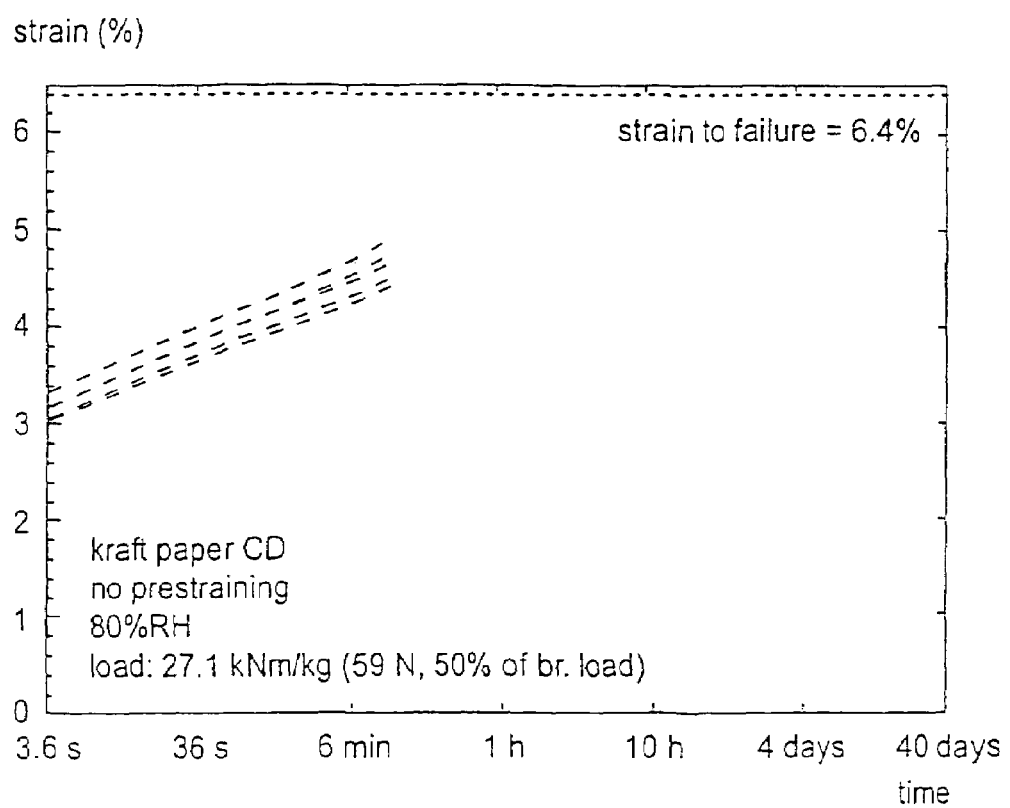
FIG. 5 shows a reference curve of expansion against time in a non pre-strained core layer of paperboard which has been subjected to a loading in its transverse direction.
Figure 6:
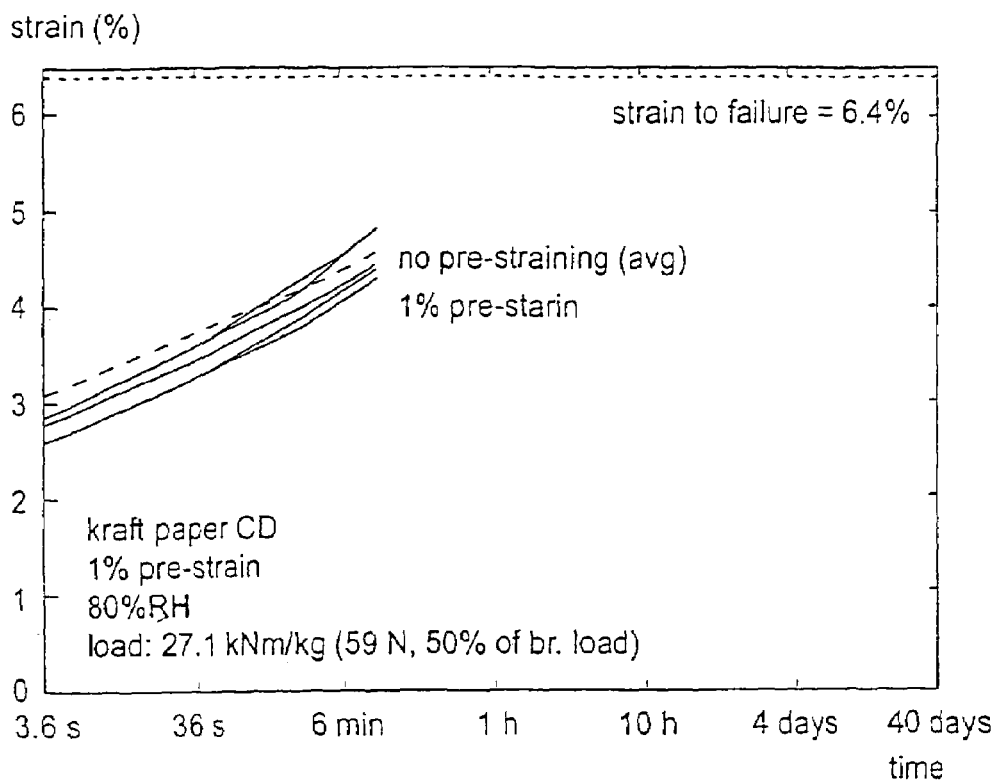
FIG. 6 shows a curve of expansion against time for a 1% pre-strained core layer of paperboard which has been subjected to a loading in its transverse direction.
Figure 7:
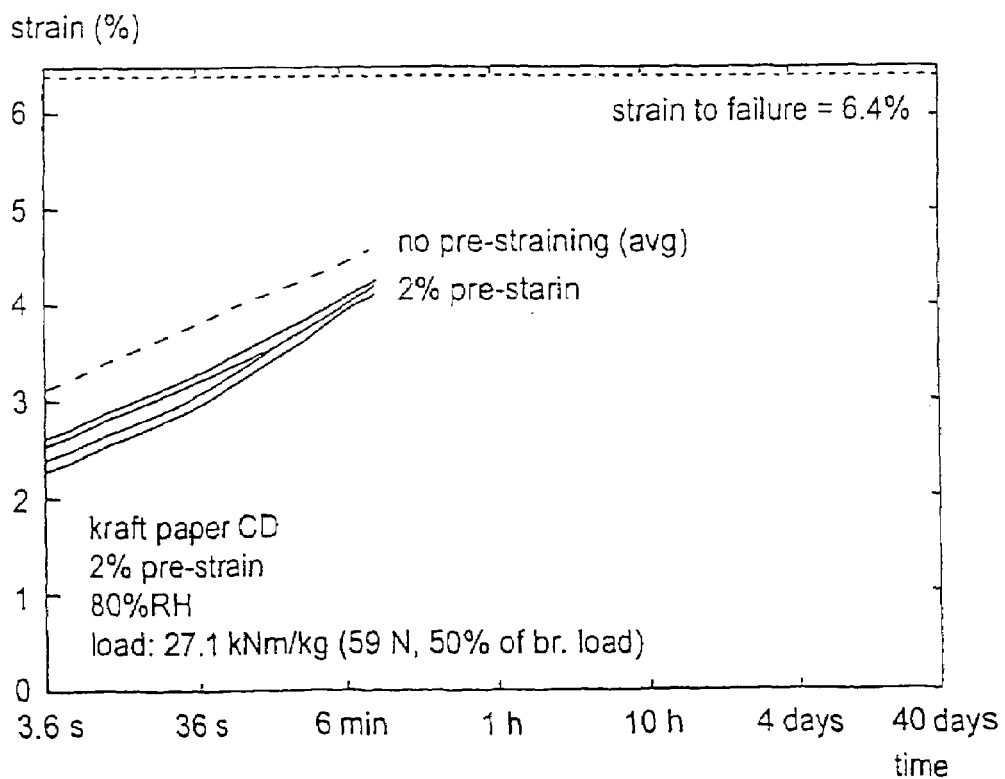
FIG. 7 shows a curve of expansion against time for a 2% pre-strained core layer of paperboard which has been subjected to a loading in its transverse direction.
Figure 8:
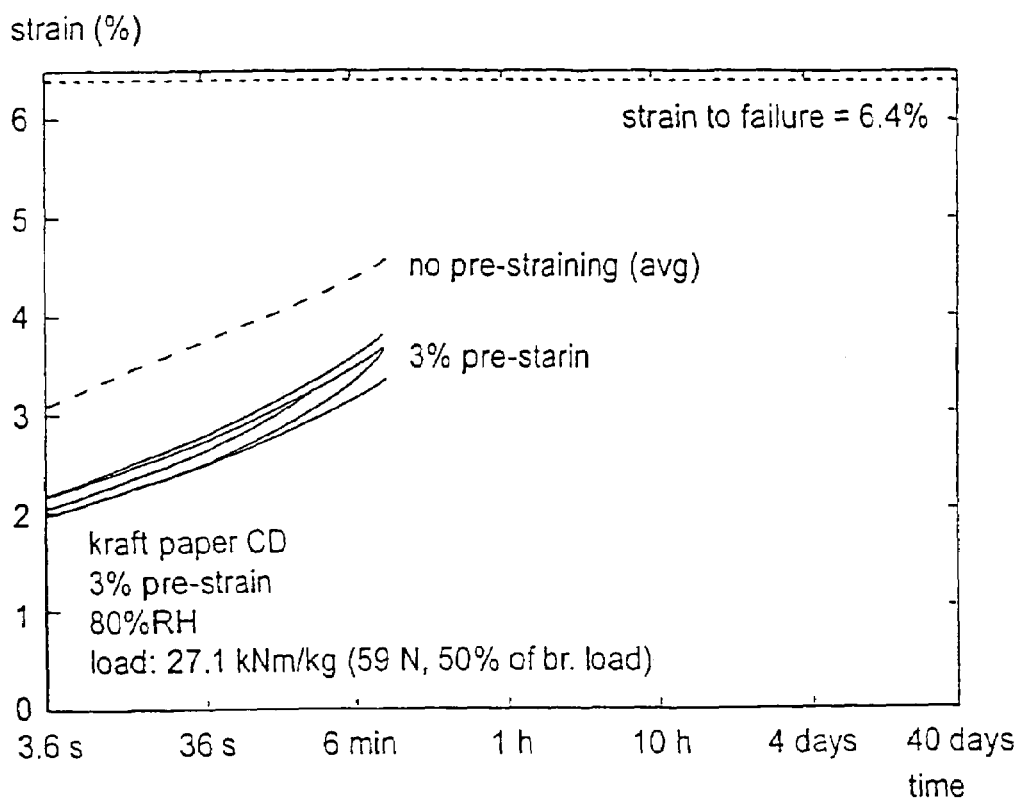
FIG. 8 shows a curve of expansion against time for a 3% pre-strained core layer of paperboard which has been subjected to a loading in its transverse direction.
Figure 9:
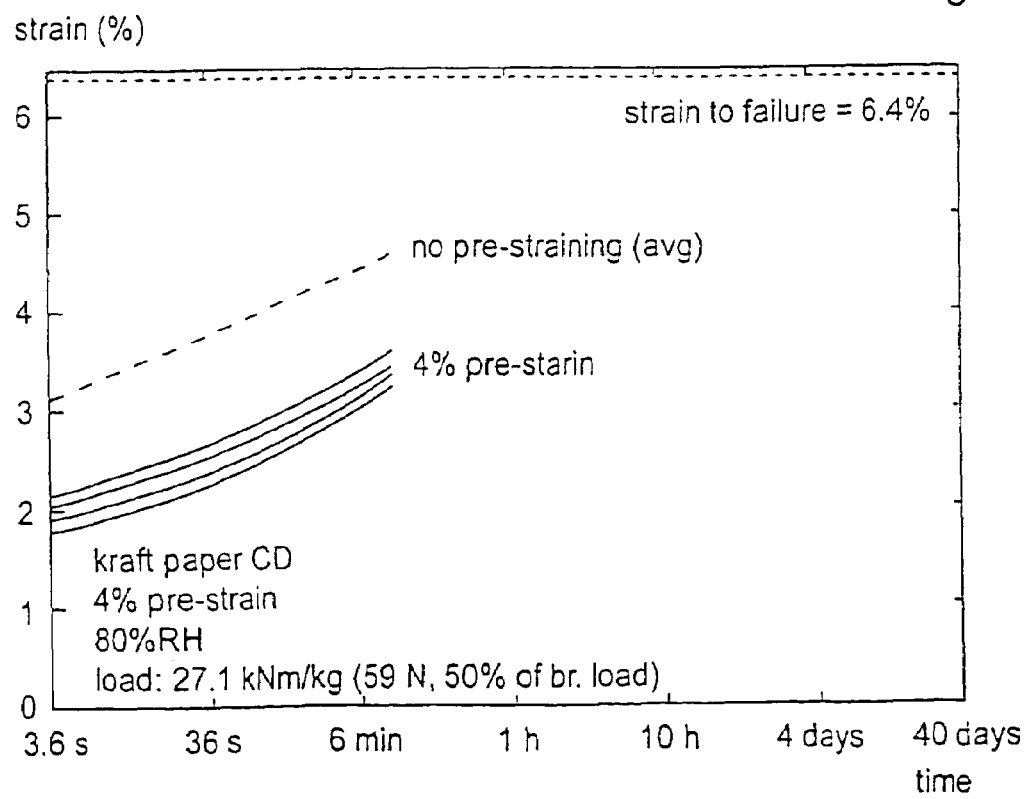
FIG. 9 shows a curve of expansion against time for a 4% pre-strained core layer of paperboard which has been subjected to a loading in its transverse direction.

FIG. 5 shows a reference curve of expansion against time for a non pre-strained Kraft paper consisting of two layers of 145 g/m² each, the Kraft paper being subjected to a loading in the transverse direction of 27.1 kNm/kg at 80% relative humidity. After roughly 10 minutes, the paper had been stretched in the transverse direction an average of around 4.5%. (The different curves show the results from several different experiments under the same conditions.)

FIGS. 6–9 show curves for corresponding experiments carried out on the same type of Kraft paper which had been pre-strained by 1, 2, 3 and 4%, respectively, prior to the experiments. It may be read off from the curves that the stretching of the material on loading reduces in relation to the degree of pre-straining. At 4% pre-straining, the paper had been stretched in the transverse direction, after roughly 10 minutes' loading of 27.1 kNm/kg at 80% relative humidity by an average of about 3.2%.

The present invention is not restricted to the embodiments described in the foregoing, but may be varied without departing from the scope of the appended claims.

What is claimed is:

1. A packaging container for a pressurized, liquid food, the packaging container being formed from a packaging laminate which includes at least one core layer of paper or paperboard, said core layer displaying one major fibre orientation in a first direction thereof, wherein said core layer is pre-strained in a second direction which is substantially at right angles to said first direction, the pre-strained core layer displaying a longitudinal dimension in the second direction that is roughly 1–6% larger than the corresponding longitudinal dimension of the core layer in the non pre-strained state.

2. The packaging container as claimed in claim 1, wherein it includes a tubular container body which displays a cylindrical or conically tapering configuration with circular cross section, said second direction substantially coinciding with a generatrix to the container body.

3. The packaging container as claimed in claim 1, wherein the pre-strained core layer displays a longitudinal dimension in the second direction that is 1–5% larger than the corresponding longitudinal dimension of the core layer in the non pre-strained state.

4. The packaging container as claimed in claim 1, wherein said packaging laminate includes two or more core layers of paper or paperboard, preferably at least two of them and even more preferably all of these core layers of paper or paperboard being pre-strained in a second direction which is substantially at right angles to said first direction in each respective core layer.

5. The packaging container as claimed in claim 1, wherein said packaging laminate also includes a gas barrier layer.

6. A packaging laminate for a packaging container as claimed in claim 1, the packaging laminate including at least one core layer of paper or paperboard, said core layer displaying one major fibre orientation in a first direction thereof, wherein said core layer is pre-strained in a second direction which is substantially at right angles to said first direction, the pre-strained core layer displaying a longitudinal dimension in the second direction that is roughly 1–6% larger than the corresponding longitudinal dimension of the core layer in the non pre-strained state.

7. The packaging laminate as claimed in claim 6, wherein the pre-strained core layer displays a longitudinal dimension in the second direction that is 1–5% larger than the corresponding longitudinal dimension of the core layer in the non pre-strained state.

8. The packaging laminate as claimed in claim 6, wherein it includes two or more core layers of paper or paperboard, preferably at least two of these and even more preferably all of these core layers of paper or paperboard being pre-strained in a second direction which is substantially at right angles to said first direction in each respective core layer.

9. The packaging laminate as claimed in claim 6, wherein it also includes a gas barrier layer.

10. A method of producing a packaging container for a pressurized, liquid food, a packaging laminate being produced, said packaging laminate including at least one core of paper or paperboard, said core layer displaying one major fibre orientation in a first direction thereof, a sheet-shaped blank of said packaging laminate being reformed into a container body which is thereafter filled with said pressurized, liquid food and closed, wherein said core layer is pre-strained in a second direction which is substantially at right angles to said first direction at a point in time either before or during the production of said packaging laminate or before the reforming of said sheet-shaped blank into a container body, or prior to or while the container body is filled with the food, the core layer being pre-strained so that a longitudinal dimension of the core layer in the second direction increases by roughly 1–6% relative to a corresponding longitudinal dimension of the core layer prior to being pre-strained.

11. The method as claimed in claim 10, wherein a movable web of said core layer or a movable web of said packaging laminate, said web displaying one major fibre orientation in its direction of movement or machine direction, is pre-strained in the second direction which consists of the transverse direction of the web, preferably in that both longitudinal edges of the web are fixedly held at the same time as the web is subjected to a tensile loading in the transverse direction, so that a longitudinal dimension of the web in said transverse direction increases by 1–5% in relation to a corresponding longitudinal dimension prior to said tensile loading.

12. The method as claimed in claim 10, wherein said container body is compression loaded interiorly by a pressuring medium before or while the container body is filled with the food, so that a longitudinal dimension of the container body increases by 1–5% in relation to a corresponding longitudinal dimension prior to said compression loading, said longitudinal dimension being oriented in said second direction which preferably coincides with a generatrix to the container body.

13. The method as claimed in claim 12, wherein said pressurizing medium consists of a gaseous pressurizing medium which is preferably applied at a pressure of 1–12 bar and even more preferably 3–8 bar.

14. The method as claimed in claim 12, wherein said pressurizing medium consists of said pressurized, liquid food, which is preferably filled at a pressure of 1–12 bar and even more preferably 3–8 bar during a requisite period of time for said pre-straining to take place, whereafter the pressure is reduced before the container body is closed into a packaging container.

15. The method as claimed in claim 10, wherein said pre-straining is carried out at at least 20%, but at most 95%, preferably at most 90% and even more preferably at most 85% of a strain to failure limit for said core layer or said packaging laminate.

16. The method as claimed in claim 10, wherein said pre-straining is carried out at an elevated temperature and/or at elevated moisture content in the core layer or core layers.

* * * * *